United States Patent
Ozer et al.

(10) Patent No.: US 8,248,949 B2
(45) Date of Patent: Aug. 21, 2012

(54) METHOD AND DEVICE FOR PROVIDING AN ALTERNATIVE BACKHAUL PORTAL IN A MESH NETWORK

(75) Inventors: Sebnem Zorlu Ozer, North Wales, PA (US); Charles R. Barker, Jr., Orlando, FL (US); William V. Hasty, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 409 days.

(21) Appl. No.: 11/858,507

(22) Filed: Sep. 20, 2007

(65) Prior Publication Data

US 2009/0080333 A1 Mar. 26, 2009

(51) Int. Cl.
*H04L 12/26* (2006.01)
(52) U.S. Cl. .................. 370/237; 370/252
(58) Field of Classification Search .......... 370/310, 370/237, 252, 241
See application file for complete search history.

(56) References Cited

U.S. PATENT DOCUMENTS

| 6,839,344 B1* | 1/2005 | Couillaud et al. ........ 370/353 |
| 2005/0025077 A1* | 2/2005 | Balasubramanian et al. 370/310 |
| 2006/0083186 A1* | 4/2006 | Handforth et al. ........ 370/310 |
| 2007/0010271 A1* | 1/2007 | Roy ........................ 455/517 |
| 2007/0070959 A1 | 3/2007 | Almeroth et al. |
| 2007/0081478 A1 | 4/2007 | Kumar |
| 2008/0090575 A1* | 4/2008 | Barak et al. ............... 455/444 |
| 2008/0181124 A1* | 7/2008 | Chari ....................... 370/252 |

OTHER PUBLICATIONS

PCT International Search Report Application No. PCT/US2008/075864 Dated Jan. 20, 2009—13 pages.

* cited by examiner

*Primary Examiner* — Anh-Vu Ly
*Assistant Examiner* — Matthew Hopkins
(74) *Attorney, Agent, or Firm* — Randi L. Karpinia

(57) ABSTRACT

A method and device for providing an alternative backhaul portal at a mesh access point in a mesh network as provided enables improved backhaul services. The method includes processing a registration of the mesh access point as an alternative backhaul portal in the mesh network. It is then determined that additional backhaul capacity is required in the mesh network. Next, the mesh access point is activated as an alternative backhaul portal in the mesh network in response to determining that additional backhaul capacity is required. Mesh network data are then routed through the alternative backhaul portal at the mesh access point until it is determined that additional backhaul capacity is no longer required. The mesh access point is then deactivated as an alternative backhaul portal in the mesh network.

16 Claims, 10 Drawing Sheets

METHOD AND DEVICE FOR PROVIDING AN ALTERNATIVE BACKHAUL PORTAL IN A MESH NETWORK

FIELD OF THE INVENTION

The present invention relates generally to wireless communication networks, and in particular to providing an alternative backhaul portal at a mesh access point in a mesh network.

BACKGROUND

Many wireless communication systems require a rapid deployment of independent mobile users as well as reliable communications between user nodes. Mesh networks, such as Mobile Ad Hoc Networks (MANETs), are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes. Large networks thus can be realized using intelligent access points (IAPs), also known as gateways or portals, which provide wireless nodes with access to a wired backhaul.

Mesh networks can provide critical communication services in various environments involving, for example, emergency services supporting police and fire personnel, military applications, industrial facilities and construction sites. Mesh networks are also used to provide communication services in homes, in areas with little or no basic telecommunications or broadband infrastructure, and in areas with demand for high speed services (e.g., universities, corporate campuses, and dense urban areas). Routing communications between two nodes in a static network generally involves simply determining the shortest route between the two nodes. However, in a mesh network, the determination of an optimal communication route may involve additional factors. For example, propagation path losses, interference between users, and channel fading may require the use of an indirect route between two nodes in order to provide an acceptable Quality of Service (QoS) to the network users.

Because the size and bandwidth demands of a mesh network may change rapidly, backhaul requirements of a mesh network may also change rapidly. If a number of mesh gateways in a mesh network is fixed, a backhaul capacity of the mesh network may be either over- or under-supplied as the size and bandwidth demands of the mesh network fluctuate. Thus, with too much backhaul capacity, a mesh network wastes physical and bandwidth resources; but with too little backhaul capacity, a mesh network may limit the performance of all network nodes and reduce overall network quality of service (QoS).

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
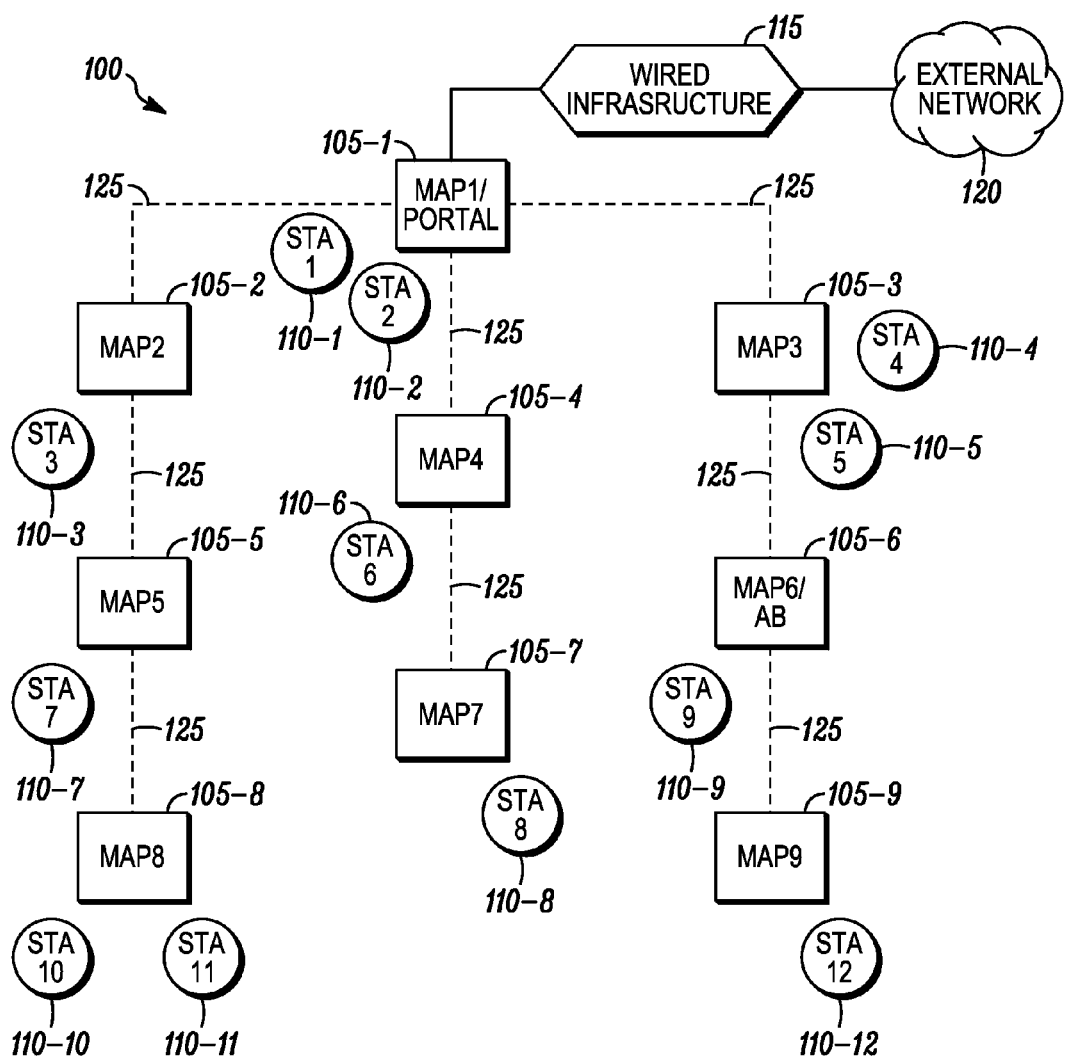
FIG. 1 is a schematic diagram illustrating a mesh network including an alternative backhaul portal, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing an alternative backhaul portal at a mesh access point in a mesh network. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of providing an alternative backhaul portal at a mesh access point in a mesh network as described herein. The non-processor circuits may include, but are not limited to, a radio receiver, a radio transmitter, signal drivers, clock circuits, power source circuits, and user input devices. As such, these functions may be interpreted as steps of a method for providing an alternative backhaul portal at a mesh access point in a mesh network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustratively provided to enable persons skilled in the art to make or use the invention and not to limit the scope of the invention which is defined by the claims.

According to one aspect, some embodiments of the present invention define a method for providing an alternative backhaul portal at a mesh access point in a mesh network. The method includes processing a registration of the mesh access point as an alternative backhaul portal in the mesh network. It is then determined that additional backhaul capacity is required in the mesh network. Alternatively, it may be determined that the current backhaul has been lost or that deployment of a temporary network without permanent infrastructure is required. Next, the mesh access point is activated as an alternative backhaul portal in the mesh network in response to determining that additional backhaul capacity is required. Mesh network data are then routed through the alternative backhaul portal at the mesh access point until it is determined that the backhaul capacity from the alternative backhaul is no longer required. The mesh access point is then deactivated as an alternative backhaul portal in the mesh network. For example, routing mesh network data through the alternative backhaul portal at the mesh access point is performed in response to load balancing requirements of the mesh network.

Some embodiments of the present invention thus enable a mesh network to activate and deactivate one or more alternative backhaul portals as necessary based on network demand. This activation and deactivation of alternative backhaul portals can substantially increase the flexibility and usability of mesh networks, which conventionally are associated with only limited and predefined backhaul options. By enabling mesh network backhaul functions to obtain self-organizing and self-healing mesh capabilities, embodiments of the present invention can provide more efficient network operations, improved network traffic load balancing, and improved overall network quality of service (QoS).

Temporary mesh networks can be deployed for emergency or other specific events that require temporary backhaul connections. Sometimes it can be difficult to estimate a peak network capacity demand for such temporary mesh networks, as traffic requirements and network conditions may show high temporal and spatial variance even though an average capacity demand is within estimated bounds. Thus the availability of alternative backhaul nodes can be very beneficial in a mesh network when a backhaul demand exceeds an existing capacity. Also, the impact of backhaul capacity problems caused by loss of a default backhaul (e.g., through a hardware failure or backhaul connection loss) can be minimized using alternative backhaul nodes.

Backhaul loss detection can be achieved using various methods. One method for backhaul loss detection is based on periodic multicasting of heartbeats from a switching center, such as a central server, to all intelligent access points (IAPs) in a network. IAPs that cannot receive the multicast messages for a period of time are marked as lost backhauls (and their node type changes to a MAP). MAP alternative backhauls can subscribe to a heartbeat multicast group when a backhaul is activated. After a backhaul is activated and a required number of heartbeats is received from the backhaul, IAP operation is then started. Another method for backhaul loss detection uses unicast bidirectional acknowledgements, or pings, sent to a known network address. This method can monitor both directions of a backhaul link. Thus MAP alternative backhauls can be preconfigured with or, through dynamic configuration, learn the address of a network entity to be pinged. Also, MAP alternative backhauls can periodically send ping requests to a network entity after the backhaul is activated. Then, after the backhaul is activated and a required number of ping replies are received from the network entity, the MAP alternative backhaul begins IAP operation. Variations of the above methods also can be used in mesh networks operating under a decentralized control arrangement, where mesh nodes themselves detect a backhaul loss without the assistance of a central server.

Referring to FIG. 1, a schematic diagram illustrates a mesh network 100 that defines a mesh domain, according to some embodiments of the present invention. The mesh network 100 comprises a plurality of mesh access point (MAP) nodes 105-*n* (i.e., MAP nodes 105-1 through 105-9) that are in wireless communication with one or more other MAP nodes 105-*n* . The MAP nodes 105-*n* are also in wireless communication with various wireless devices called station (STA) nodes 110-*n* (i.e., STA nodes 110-1 through 110-12). Some of the STA nodes 110-*n* may also be in direct wireless communication with other STA nodes 110-*n*.

As shown, only the MAP node 105-1 is presently in communication with a wired infrastructure 115. The wired infrastructure 115 is then operatively connected to an external network 120, such as the Internet, a public land mobile network (PLMN), a public switched telephone network (PSTN), or an equivalent. Thus only the MAP node 105-1 is presently functioning as a backhaul portal between the mesh network 100 and the external network 120. If the quantity of STA nodes 110-*n* that seek to download or upload communication traffic to the external network 120 through the MAP node 105-1 increases, or the traffic demands of STA nodes 110-*n* increases, the backhaul capacity of the MAP node 105-1 may be exceeded. This situation could cause an overall network quality of service (QoS) to be degraded.

Therefore, according to some embodiments of the present invention, additional MAP nodes 105-*n* in the mesh network 100 can be identified as alternative backhaul portals. For example, the MAP node 105-6 is identified as an alternative backhaul portal. As described in detail below, as the backhaul needs of the mesh network 100 change, the MAP node 105-6 can be reconfigured to function as either a conventional mesh access point, or as an intelligent access point (IAP) that can provide a backhaul portal to the external network 120. Wireless communication links 125 between the MAP nodes 105-*n* then also can be reconfigured to provide appropriate backhaul load sharing when both the MAP node 105-1 and the MAP node 105-6 are functioning as active backhaul portals.

Figure 2:
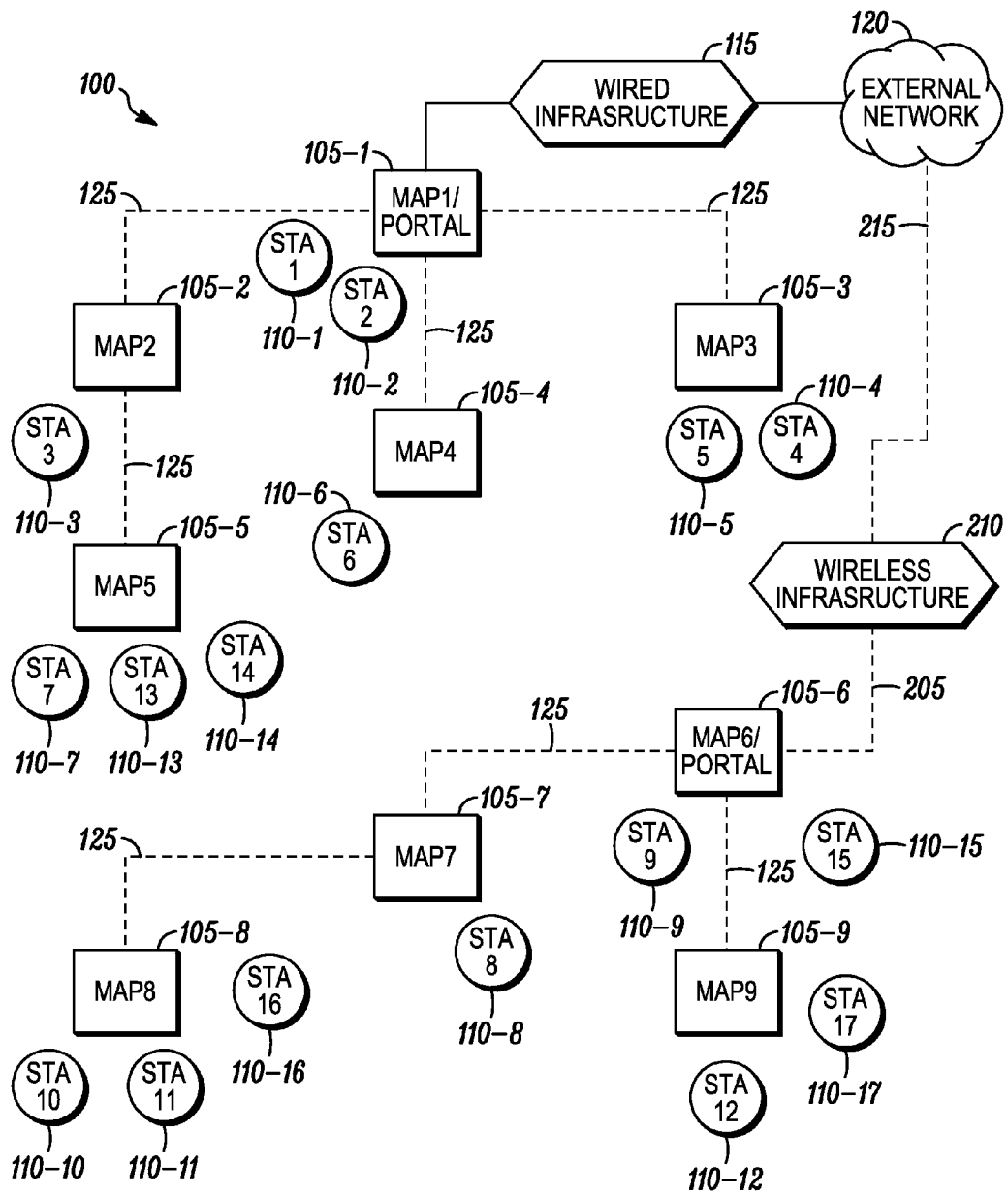
FIG. 2 is a schematic diagram illustrating a reconfiguration of the mesh network of FIG. 1, according to some embodiments of the present invention.

Referring to FIG. 2, a schematic diagram illustrates a reconfiguration of the mesh network 100, including operation of an alternative backhaul portal, according to some embodiments of the present invention. Consider that additional STA nodes 110-13 through 110-17 have joined the mesh network 100 and are operatively connected to the various MAP nodes 105-*n*. Further, consider that a backhaul capacity of the MAP node 105-1 is exceeded or is nearly exceeded. Therefore, the MAP node 105-6 is activated as an alternative backhaul portal in the network 100.

Activation of the MAP node 105-6 as an alternative backhaul portal includes the MAP node 105-6 establishing a wireless backhaul link 205 with a wireless infrastructure 210, which in turn maintains a communication link 215 with the external network 120. For example, the wireless infrastructure 210 may comprise a neighboring foreign wireless network that has agreed to provide, on demand, alternative backhaul services to the mesh network 100. The wireless communication links 125 between other MAP nodes 105-*n* are then adaptively reconfigured to provide effective network load balancing and quality of service (QoS). Subsequently, if the backhaul requirements of the mesh network 100 decrease, the wireless backhaul link 205 may no longer be needed. The MAP node 105-6 then can be deactivated as an alternative backhaul portal, and the mesh network 100 can return to the configuration shown in FIG. 1. It will be appreciated by those of ordinary skill in the art that this process of activation and deactivation can be repeated for more than just one MAP node 105-*n* as network requirements change.

The alternative backhaul at the MAP node 105-6 can exchange level two (L2) messages with other portals in order to keep connections seamless and prevent the need for level three (L3) address changes when the alternative backhaul is activated. To provide this functionality while using portable interfaces (e.g. evolution-data optimized (EVDO) cards), one solution uses a Virtual Private Network (VPN) client at the MAP node 105-6. Another solution connects the backhaul link through a router that will tunnel L2 mesh messages to the external network 120. For this latter solution, the MAP node 105-6 should have proxy address resolution protocol (ARP) capabilities.

Activation and deactivation of alternative backhaul portals, and associated reconfiguration of a mesh network, can be accomplished in various ways, according to different embodiments of the present invention. For example, when manual intervention is used, need for a new backhaul can be determined by a network operator. For temporary emergency deployments, loss of backhaul observed at a central server (identified as a "Mesh Manager") application, or an increased number of emergency personnel, can trigger a manual activation of alternative backhaul. Automatic activation and deactivation of alternative backhauls may be performed by a central server, current gateway or any wireless router, including MAPs with alternative backhaul capabilities. For example, if a mesh domain in a mesh network is managed by a central server, the central server can activate and deactivate alternative backhaul portals, and reconfigure connections between MAPs, as network operating conditions change. Alternatively, if control of a mesh network is distributed among various MAPs or other network elements, then status information about alternative backhaul portals can be broadcast throughout the network using, for example, HELLO messages. As known by those having ordinary skill in the art, in an approach known as mesh scalable routing (MSR), mesh nodes periodically (e.g., once per second) send HELLO messages (e.g., once per second) that contain routing information and metrics associated with a route to a gateway. These messages may be distributed through beacons or other management messages as information elements. Mobile nodes also use information extracted from HELLO messages for other purposes, such as deciding a most efficient manner for performing a link handoff.

Figure 3:
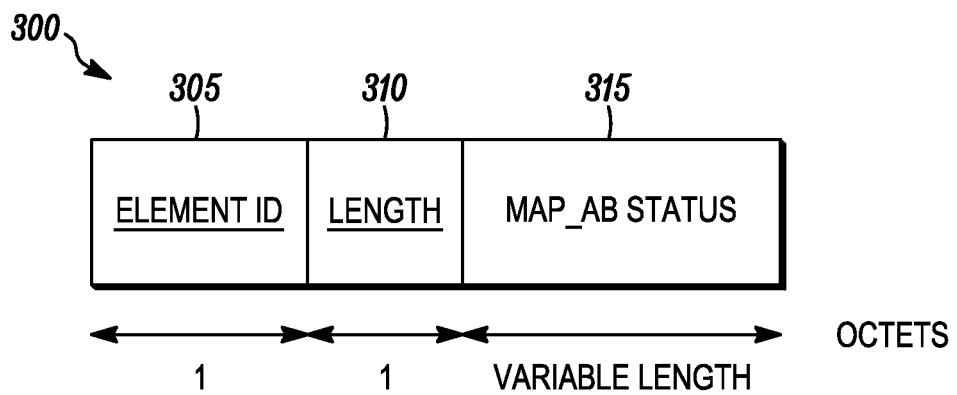
FIG. 3 is a block diagram illustrating components of a status information element used in a mesh network, according to some embodiments of the present invention.

Referring to FIG. 3, a block diagram illustrates components of a status information element 300 used in the mesh network 100, according to some embodiments of the present invention. The status information element 300 can be transmitted from a MAP node 105-*n* having alternative backhaul capabilities to a central control point, such as a central server or another MAP node 105-*n*, in the mesh network 100. The status information element 300 may include, for example, an element identification (ID) field 305, a length field 310, and a MAP alternative backhaul (MAP_AB) status field 315. The MAP_AB status field 315 may include data such as a current status bit, location information about the MAP node 105-*n*, backhaul capacity information, mesh interface/capacity information, and other capabilities information. In a mesh network using distributed control, the status information element 300 can be periodically broadcast through the network, similar to HELLO messages.

Based on a selected activation approach (i.e., centralized or distributed), the status information element 300 may be used to increase network efficiency during backhaul transition periods. For example, when an additional backhaul is needed, current portals may send queries to other MAPs to learn about alternative backhauls. However, this can increase a required transition time. On the other hand, a central server and current portal can obtain information about a MAP with alternative backhaul capability during a registration of the MAP, and the information can be updated afterwards. This enables a central server and current portal to create a list of preferred alternative backhauls based on network and traffic conditions.

Alternatively, information can be distributed throughout an IAP/mesh domain so that MAP nodes can proactively create a list of alternative backhauls, similar to listing preferred active portals. Whereas storing route and capacity metrics for active portals is based on active traffic directed towards these portals, estimating such metrics for alternative backhauls can be less accurate because portal activations can create significant network topology changes. When a MAP alternative backhaul is activated, all traffic sources that are affected by a bottleneck mesh point or portal may try to route traffic to the newly activated alternative backhaul, thus causing unbalanced load distribution in the network. To overcome this, association and route requests to the new alternative backhaul can be denied if a predetermined time interval is not reached since a last request. Route and capacity metrics estimated proactively then can determine the mesh points that should bind with the new alternative backhaul by comparing the requirements of traffic destined for an external network with an estimated capacity of the new alternative backhaul and the topology of the network (e.g., a number of hops to the alternative backhaul). Mesh points that would serve the traffic sources passing through bottleneck points can then process the proactive route and capacity requirements of the source/intermediate nodes and send bind requests with the requirements. A MAP alternative backhaul can then deny or accept the bind request, and can also update and distribute its capacity and route metrics when new requests are accepted.

Keeping alternative routes to MAP alternative backhauls, or probing the alternative backhauls to estimate route and capacity metrics, may increase a network overhead. However, various approaches can be used to reduce such overhead. For example, a MAP nodes' route and capacity estimation for alternative backhauls may be performed only when capacity degradation is greater than a first threshold. Then, when capacity degradation is greater than a second threshold, an activation request may be sent for a maintained route.

Figure 4:
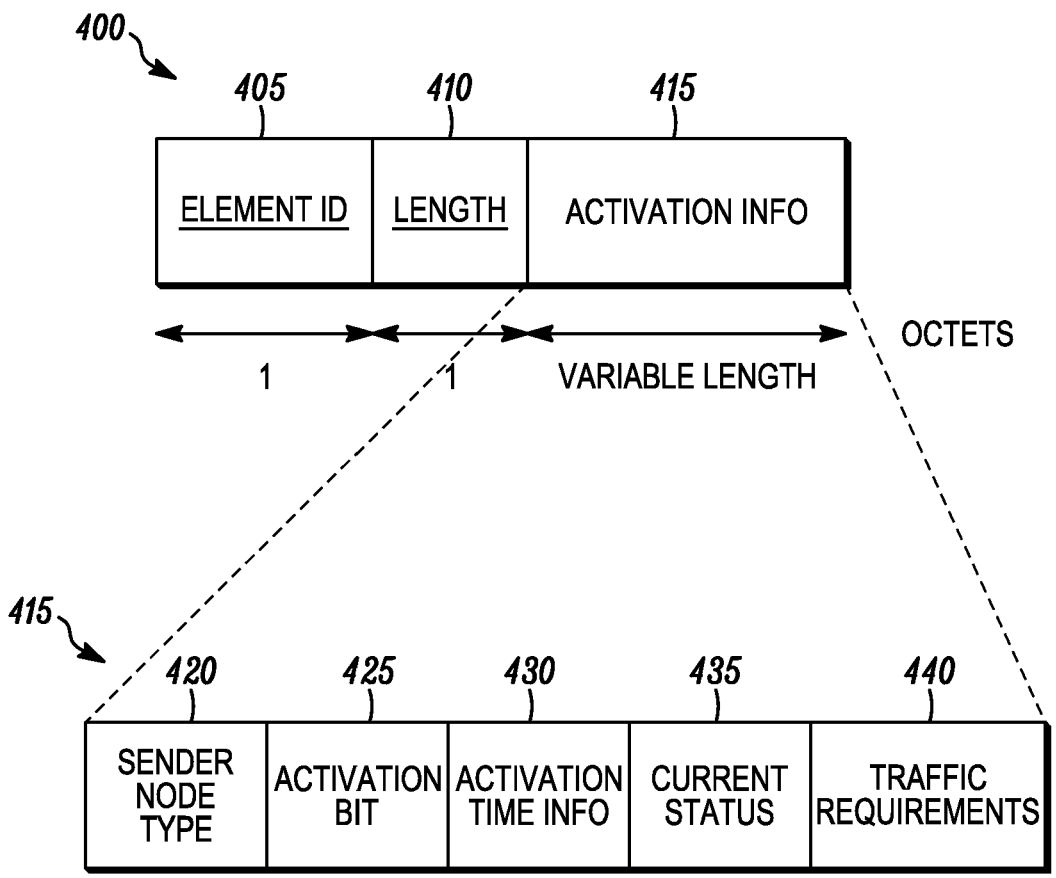
FIG. 4 is a block diagram illustrating components of a backhaul activation request information element, which can be transmitted to a mesh access point (MAP) node having alternative backhaul capabilities, according to some embodiments of the present invention.

Referring to FIG. 4, a block diagram illustrates components of a backhaul activation request information element 400, which can be transmitted to a MAP node 105-$n$ having alternative backhaul capabilities, according to some embodiments of the present invention. The backhaul activation request information element 400 comprises an element ID field 405, a length field 410, and an activation information field 415. The element ID field 405 provides a unique identification of an element 400. The length field 410 identifies a length in bytes of an element 400, and the activation information field 415 can provide various information about how and when alternative backhaul capacities of a MAP node 105-$n$ should be activated.

For example, according to some embodiments of the present invention, the activation information field 415 can comprise a sender node type subfield 420, which may indicate whether a sender node is another MAP node 105-$n$, a central server, or another type of node. An activation bit subfield 425 can comprise a bit value set to a value of "0" or "1". If the bit is set to "1", it indicates that activation of an alternative backhaul portal is required immediately; whereas if the bit is set to "0", it indicates that immediate activation of an alternative backhaul portal is not required. For example, the activation bit subfield 425 may be set to a value of "0" to indicate that a capacity margin of the mesh network 100 has become small, and therefore a MAP node 105-$n$ that receives the backhaul activation request information element 400 should proactively prepare for possible activation of its backhaul portal. An activation time information subfield 430 can be used to indicate a time when backhaul functionalities of a MAP node 105-$n$ must start. For example, an activation time information field 430 can comprise an absolute time to activate a backhaul portal if the mesh network 100 is synchronized. As known by those having ordinary skill in the art, a synchronized mesh network means the timing information at the nodes of the network are the same. For example, a central server may have a reference time that is distributed to gateways and then to MAPs/wireless routers.

Alternatively, the activation time information subfield 430 can comprise beacon intervals if the mesh network 100 is, for example, a non-synchronized Institute of Electrical and Electronics Engineers (IEEE) 802.11 network. The activation time information subfield 430 can also comprise a deactivation time or periodic activation times. For example, periodic activation times may be used when network use is known to increase at particular times of day. IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

A current status subfield 435 may include current mesh domain information concerning the mesh network 100, and current capacity and/or route metrics sent from a backhaul portal to specific MAP nodes 105-$n$. Finally, a traffic requirements subfield 440 may identify aggregated traffic to be served with a parameterized QoS, or may identify traffic priorities such as "best efforts" or "background" traffic priorities that should govern traffic through a backhaul portal. A traffic requirements subfield 440 may also identify traffic from specific MAP nodes 105-$n$.

If load balancing is enabled at a specific MAP node 105-$n$, or at a central network server, a backhaul activation request information element 400 can be used to inform a MAP node 105-$n$ of specific traffic requirements that an activated backhaul portal will be expected to meet. Such specific traffic requirements then can be refined according to subsequent backhaul activation request information elements 400. Activation and deactivation requests may be acknowledged by an alternative backhaul node using status and reason codes that provide details regarding the acknowledgement.

Figure 5:
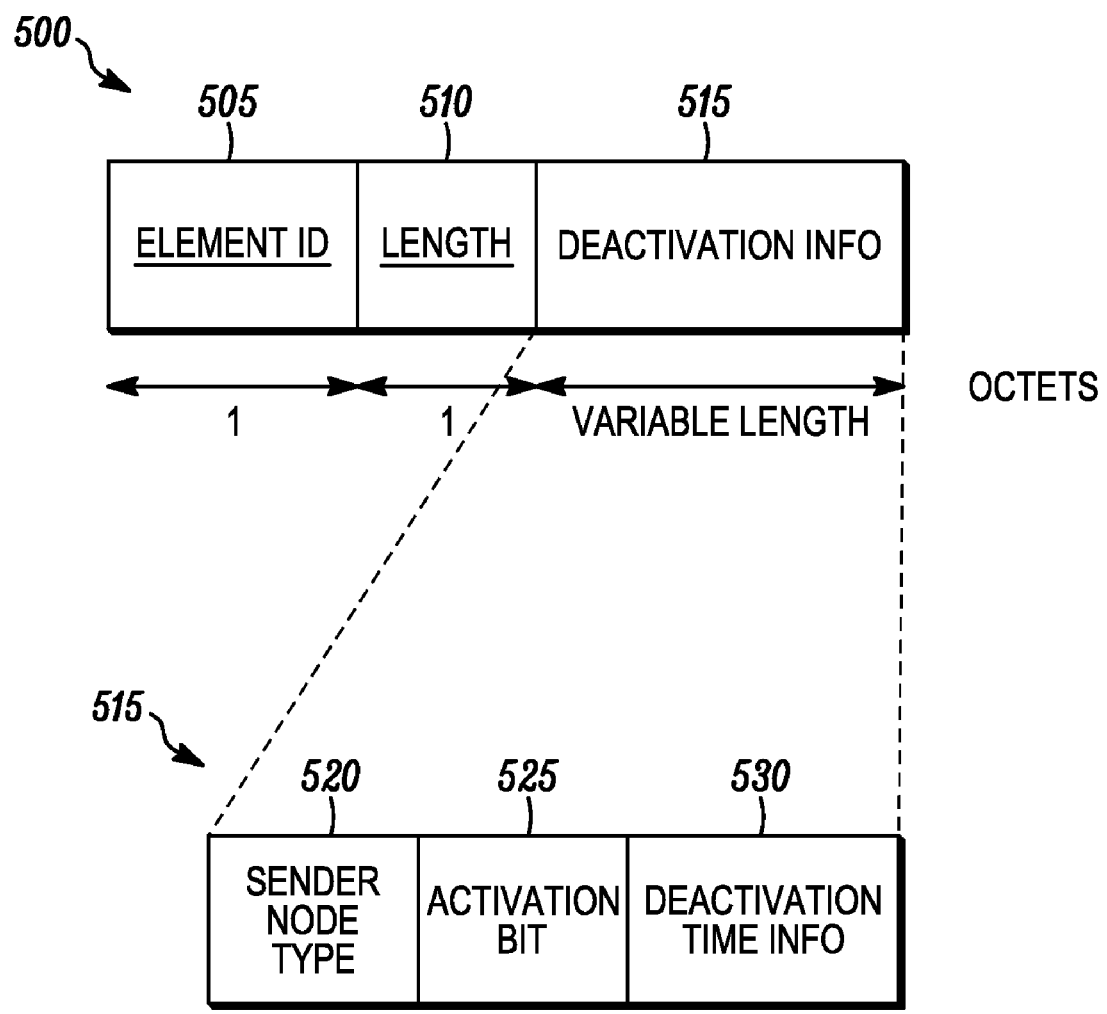
FIG. 5 is a block diagram illustrating components of a backhaul deactivation request information element, which can be transmitted to a MAP node having alternative backhaul capabilities, according to some embodiments of the present invention.

Referring to FIG. 5, a block diagram illustrates components of a backhaul deactivation request information element 500, which can be transmitted to a MAP node 105-$n$ having alternative backhaul capabilities, according to some embodiments of the present invention. The backhaul deactivation request information element 500 comprises an element ID field 505, a length field 510, and a deactivation information field 515. The element ID field 505 provides a unique identification of an element 500. The length field 510 identifies a length in bytes of an element 500, and the deactivation information field 515 can provide various information about how and when alternative backhaul capacities of a MAP node 105-$n$ should be deactivated.

For example, according to some embodiments of the present invention, the deactivation information field 515 can comprise a sender node type subfield 520, which may indicate whether a sender node is another MAP node 105-$n$, a central server, or another type of node. A deactivation bit subfield 525 can comprise a bit value set to a value of "0" or "1". If the bit is set to "1", it indicates that deactivation of an alternative backhaul portal is required immediately; whereas if the bit is set to "0", it indicates that immediate deactivation of an alternative backhaul portal is not required. For example, the deactivation bit subfield 425 may be set to a value of "0" to indicate that a capacity margin of the mesh network 100 has increased, and therefore a MAP node 105-$n$ that receives the backhaul deactivation request information element 500 should proactively prepare for possible deactivation of its backhaul portal. A deactivation time information subfield 530 can identify an absolute time or a time indicated by a beacon interval. A deactivation time then can be set to ensure that a MAP node 105-$n$ has enough time to announce its deactivation status change to associated MAP nodes 105-$n$ and STA nodes 110-$n$ to ensure smooth handovers and propagation of updated information throughout the mesh domain. For example, such status change information can be distributed throughout the mesh network 100 by broadcasting a backhaul deactivation request information element 500.

Figure 6:
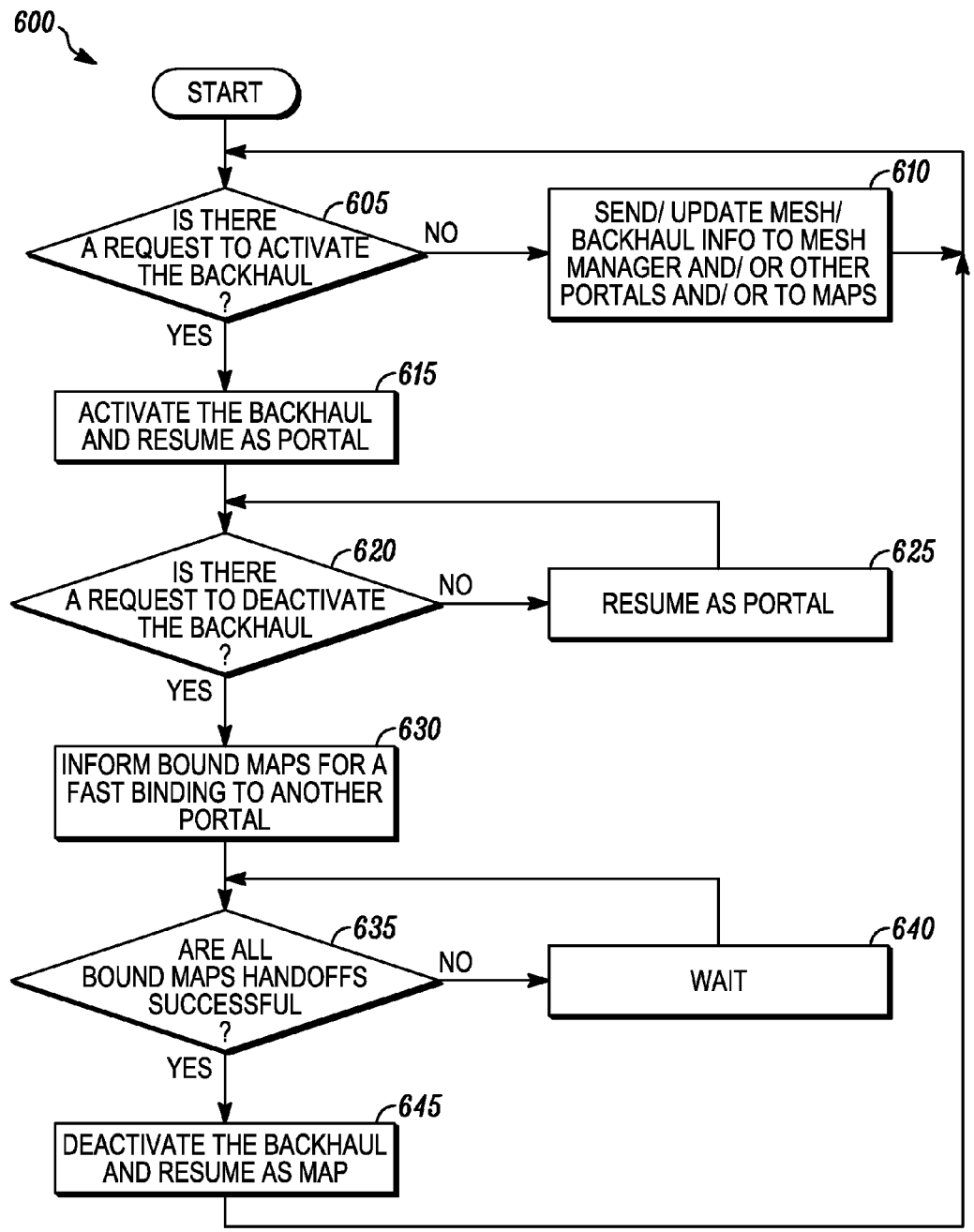
FIG. 6 is a general flow diagram illustrating a method for activating and deactivating a backhaul at a MAP node, according to some embodiments of the present invention.

Referring to FIG. 6, a general flow diagram illustrates a method 600 for activating and deactivating a backhaul at the MAP node 105-6, according to some embodiments of the present invention. At step 605 it is determined whether a request has been received from a central server (identified as a "Mesh Manager"), an active portal such as the MAP node 105-1 or an intermediate MAP node in the same domain (including the MAP node 105-6 itself), to activate the alternative backhaul portal. If not, at step 610 a status information element 300 is transmitted from the MAP node 105-6 to the Mesh Manager and/or active portal and/or other MAPs in the same domain depending on a selected control approach (i.e., centralized or distributed); if so, at step 615, the alternative backhaul portal is activated and the wireless backhaul link 205 is established with the wireless infrastructure 210. The mesh network 100 is then reconfigured as shown in FIG. 2.

At step 620, it is determined whether a request has been received to deactivate the alternative backhaul portal. If not, at step 625, the MAP node 105-6 continues operation as a portal and the method 600 loops back to step 620; if so, at step 630, the MAP node 105-6 transmits messages to other MAP nodes 105-n to which the MAP node 105-6 is bound (namely, MAP nodes 105-7, 105-8, and 105-9). The messages instruct these other MAP nodes 105-n to execute a fast binding to another backhaul portal. At step 635, it is then determined whether each of the MAP nodes 105-7, 105-8, and 105-9 have been able to successfully execute a handoff. If not, at step 640 the method 600 pauses and then loops back to step 635; if so, at step 645, the backhaul portal of the MAP node 105-6 is deactivated. The method 600 then loops back to step 605. When the MAP node 105-6 continues operation as a portal (at step 625), it may send HELLO messages with a new field to indicate its backhaul type. For example, if activation-deactivation times are periodic based on daily network usage fluctuations, information in the HELLO messages can be used by other MAPs that form a preference list for portals.

Figure 7:
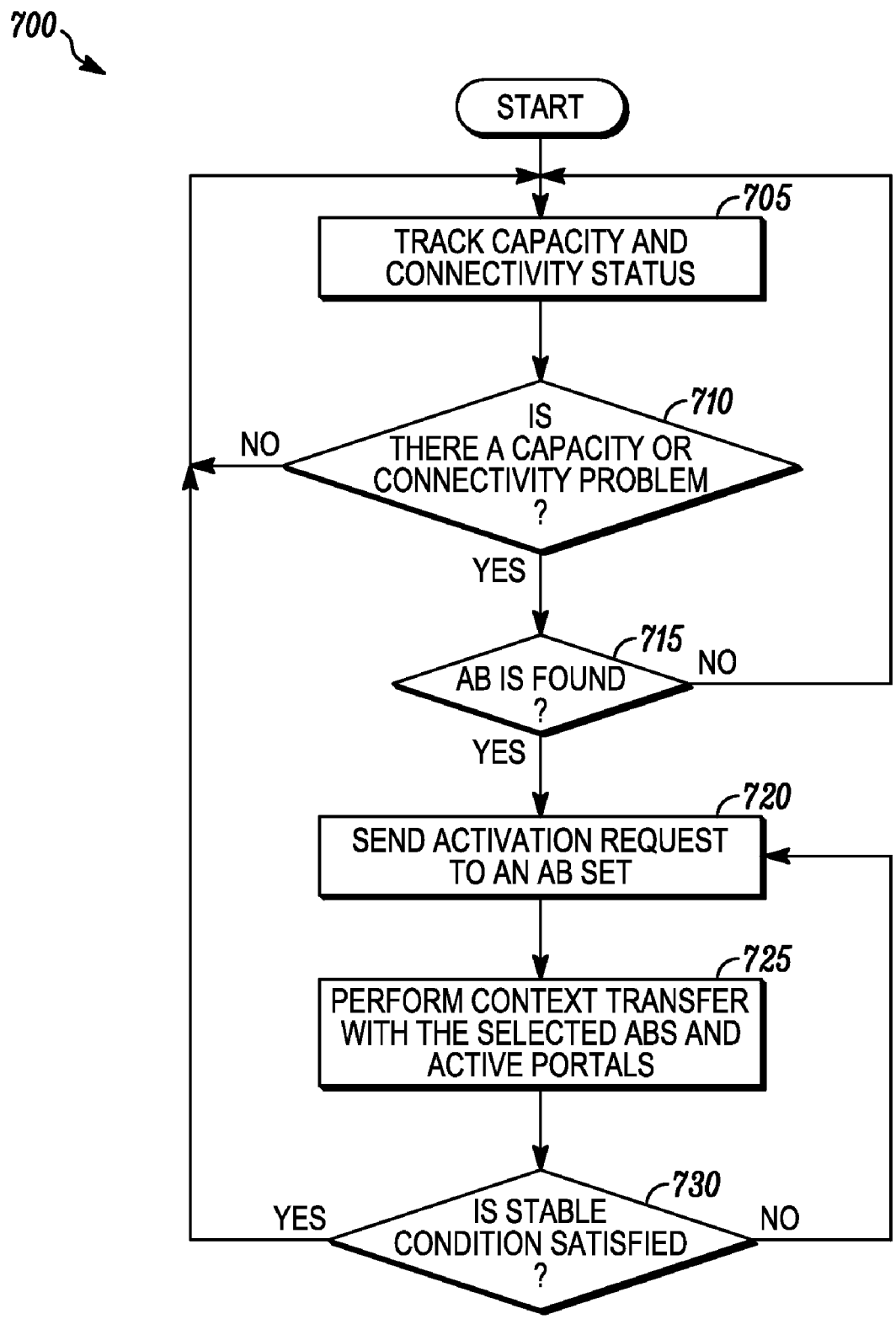
FIG. 7 is a general flow diagram illustrating a method for activating an alternative backhaul portal at a MAP node by a central server, according to some embodiments of the present invention.

Referring to FIG. 7, a general flow diagram illustrates a method 700 for activating an alternative backhaul portal at the MAP node 105-6 using a central server (Mesh Manager), according to some embodiments of the present invention. At step 705, a capacity and connectivity status in the mesh domains connected by the active backhaul portals is monitored. At step 710, it is determined whether a capacity or connectivity problem exists at one of the backhaul portals (such as at the MAP node 105-1). For example, a problem may be in the mesh domain controlled by the active portal at the MAP node 105-1 (e.g., due to load balancing problems causing an overloaded intermediate MAP node). If not, then the method 700 loops back to step 705; if so, then at step 715 it is determined whether an eligible alternative backhaul (AB) is known. If not, then the method 700 loops back to step 705.

If at step 715 it is determined that an alternative backhaul is known, then at step 720 a message describing the capacity or connectivity problem is sent with an activation request to one or more local alternative backhaul nodes. At step 725 a context transfer is then performed with the local alternative backhaul(s) and active portals, and the method 700 proceeds to step 730. At step 730, it is determined whether a stable condition has been reached in the mesh domain. If so, the method 700 returns to step 705; if not, the method 700 returns to step 720.

Figure 8:
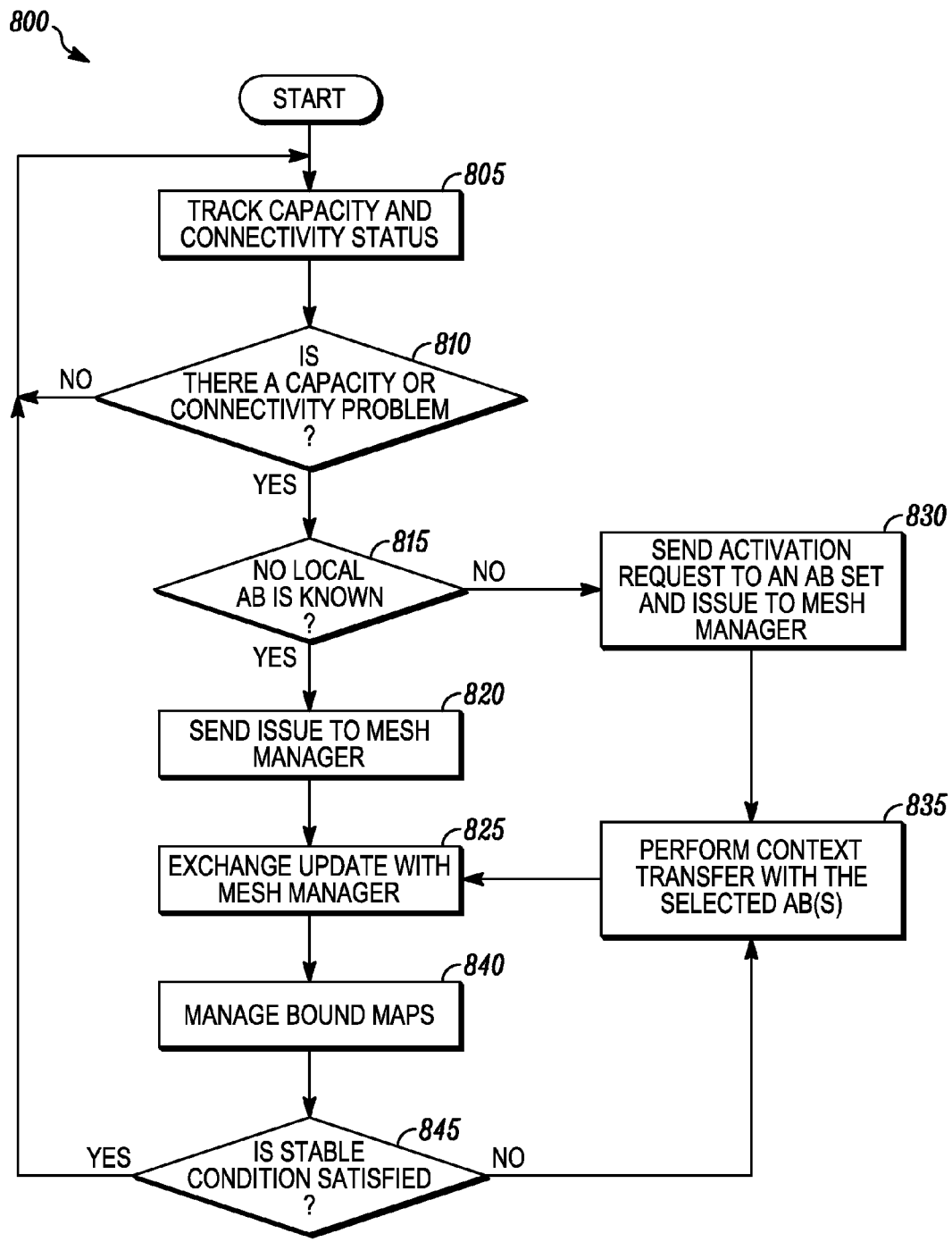
FIG. 8 is a general flow diagram illustrating a method for activating an alternative backhaul portal at a MAP node by an active portal, according to some embodiments of the present invention.

Referring to FIG. 8, a general flow diagram illustrates a method 800 for activating an alternative backhaul portal at the MAP node 105-6 using an active portal, according to some embodiments of the present invention. At step 805, a capacity and connectivity status at the active backhaul portal at the MAP node 105-1 is monitored. At step 810, it is determined whether a capacity or connectivity problem exists at the backhaul portal at the MAP node 105-1. For example, a problem may be in the mesh domain controlled by the active portal at the MAP node 105-1 (e.g. due to load balancing problems causing an overloaded intermediate MAP node). If not, then the method 800 loops back to step 805; if so, then at step 815 it is determined whether no local alternative backhaul is known. A local alternative backhaul is an alternative backhaul in the mesh domain controlled by the MAP node 105-1. If no local alternative backhaul is known, then at step 820 a status information element 300 describing the capacity or connectivity problem is sent to a Mesh Manager. At step 825, update messages are then exchanged with the Mesh Manager.

If at step 815 it is determined that a local alternative backhaul is known, then at step 830 a message describing the capacity or connectivity problem is sent with activation requests to one or more local alternative backhaul nodes and to the Mesh Manager. At step 835 a context transfer is then performed with the local alternative backhaul(s), and the method 800 proceeds to step 825. The context transfer can reduce the risks related to multiple simultaneous handoffs to the new portal. For example, MAPs that find a new portal has better (within a threshold) metrics will request to bind with the new portal. Based on the context transfer after handoffs, the portals can share this information to balance the network load by selectively denying some requests, since MAP network updates may be slower. Context transfer from portals and a central server may also include activation cause information (e.g., loss of the current backhaul), so that new portals can accept bind requests accordingly. At step 840 the MAP node 105-1 proceeds to manage all MAP nodes 105-n that are presently bound to the MAP node 105-1, but may handoff to the new portal. Finally, at step 845, it is determined whether a stable condition has been reached at the MAP node 105-1 and the mesh domain. If so, the method 800 returns to step 805; if not, the method 800 returns to step 835.

Figure 9:
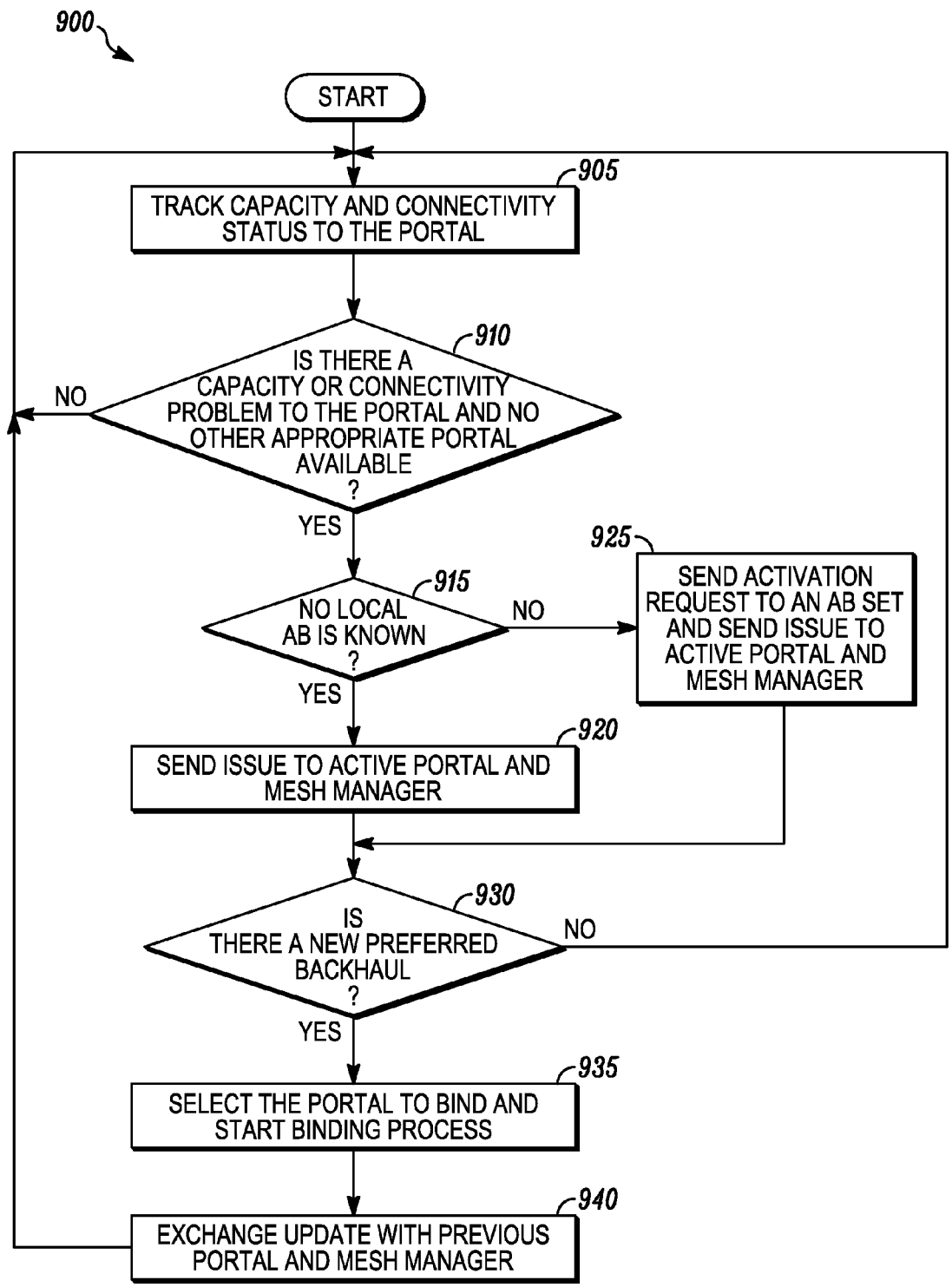
FIG. 9 is a general flow diagram illustrating a method for activating an alternative backhaul portal at a MAP node by an intermediate MAP node, according to some embodiments of the present invention.

Referring to FIG. 9, a general flow diagram illustrates a method 900 for activating an alternative backhaul portal at the MAP node 105-6 by an intermediate MAP node 105-n, according to some embodiments of the present invention. At step 905, a capacity and connectivity status of an active backhaul portal at the MAP node 105-1 and its mesh domain is monitored. This enables the intermediate MAP node 105-n to differentiate a problem (e.g., whether a problem is due to connection/capacity problems at the active backhaul portal or in the local neighborhood, or at an intermediate node on a route to the portal). For example, a portal may have enough capacity, but an intermediate MAP node 105-n may be a bottleneck point due to load balancing problems. At step 910, it is determined whether a capacity or connectivity problem exists at the active backhaul portal, and that there is no other active alternative portal in the domain. If not, then the method 900 loops back to step 905; if so, then at step 915 it is determined whether no local alternative backhaul is known. If no local alternative backhaul is known, then at step 920 a status information element 300 describing the capacity or connectivity problem is sent to the active backhaul portal and to a Mesh Manager. Step 920 may be feasible only if there is still a connection to the portal and Mesh Manager; otherwise, step 920 may be skipped. Another option is to distribute (e.g., broadcast multiple hops away) a warning to other nodes that may reach a portal and hence a central server.

If at step 915 it is determined that a local alternative backhaul is known, then at step 925 a message describing the capacity or connectivity problem is sent to one or more local alternative backhaul nodes with activation requests and to the active portal and Mesh Manager, if the connection is still available. At step 930, it is determined whether there is a new preferred backhaul. If not, then the method 900 loops back to step 905; if so, then at step 935 the preferred new portal is selected and a binding process is started. At step 940, update messages are then exchanged with the previous portal and Mesh Manager. Step 940 may be implemented by the portals where the handoff occurs. Other roles also may be shared by the portal or Mesh Manager so that centralized and distributed approaches may be combined.

Figure 10:
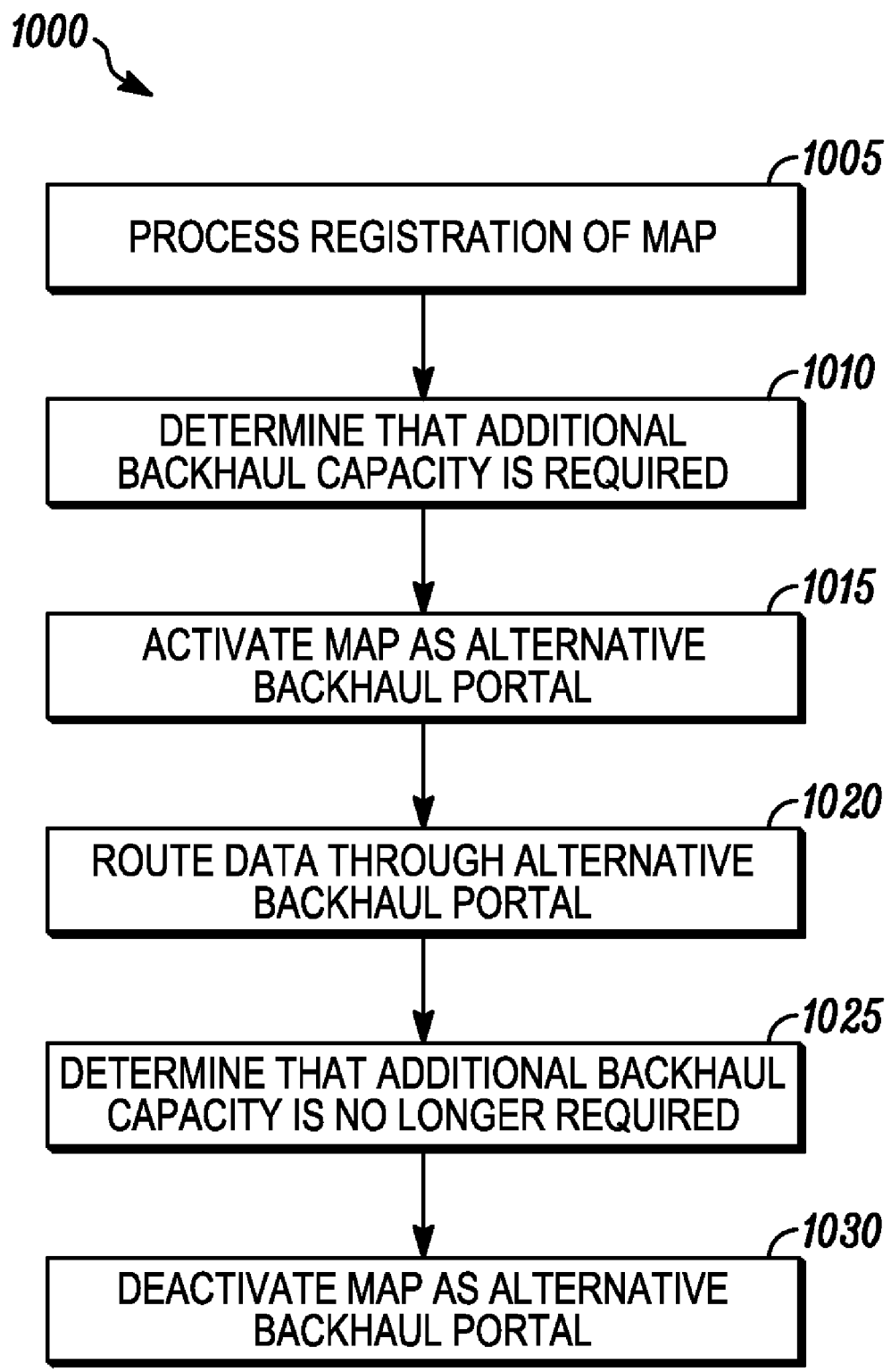
FIG. 10 is a general flow diagram illustrating a method for providing an alternative backhaul portal at a mesh access point in a mesh network, according to some embodiments of the present invention.

Referring to FIG. 10, a general flow diagram illustrates a method 1000 for providing an alternative backhaul portal at a mesh access point in a mesh network, according to some embodiments of the present invention. At step 1005, a registration of the mesh access point as an alternative backhaul portal in the mesh network is processed. For example, a registration of the MAP node 105-6 as an alternative backhaul portal in the mesh network 100 is received and processed at the MAP node 105-1.

At step 1010, it is determined that additional backhaul capacity is required in the mesh network. For example, the MAP node 105-1 may determine that a backhaul capacity of its backhaul portal may not be able to meet a growing demand in the mesh network 100 for backhaul services. Alternatively, the MAP node 105-6 or another MAP node 105-n in the mesh domain may recognize that the backhaul capacity of the backhaul portal of the MAP node 105-1 is inadequate to meet an increasing demand for backhaul services. The additional backhaul capacity thus may be required for various reasons, such as because of increase backhaul demand or because of a loss of backhaul capacity at an existing backhaul portal.

At step 1015, the mesh access point is activated as an alternative backhaul portal in the mesh network in response to determining that additional backhaul capacity is required. For example, the MAP node 105-6 may be activated as an alternative backhaul portal by transmitting a backhaul activation request information element 400 from the MAP node 105-1 to the MAP node 105-6. Alternatively, the MAP node 105-6 or another MAP node 105-n in the mesh domain may activate its alternative backhaul portal in response to recognizing a network need for additional backhaul services. Also, the alternative backhaul portal can be established in various ways at various locations, including as a new backhaul interface at an existing backhaul portal.

At step 1020, mesh network data are routed through the alternative backhaul portal at the mesh access point. For example, mesh network data are routed from the STA node 110-8 to the MAP node 105-7, then to the MAP node 105-6 and through the wireless backhaul link 205.

At step 1025, it is determined that additional backhaul capacity is no longer required in the mesh network. For example, a Mesh Manager operating at the MAP node 105-1 may determine that additional backhaul capacity is no longer required in the mesh network 100. Alternatively, if the mesh network 100 is managed through a distributed process, a decision that additional backhaul capacity is no longer required may be reached at any MAP node 105-n based on distributed network management information.

At step 1030, the mesh access point is deactivated as an alternative backhaul portal in the mesh network in response to determining that additional backhaul capacity is no longer required. For example, the MAP node 105-6 may be deactivated as an alternative backhaul portal by transmitting a backhaul deactivation request information element 500 from the MAP node 105-1 to the MAP node 105-6. Alternatively, the MAP node 105-6 or another MAP node 105-n in the mesh domain may deactivate its alternative backhaul portal in response to recognizing that additional backhaul capacity in the mesh network 100 is no longer required.

According to some embodiments of the present invention, a MAP node with an alternative backhaul capability may occasionally establish a backhaul link to connect to a mesh central server without activating the node's portal functionalities. This option may be selected in several circumstances, e.g. when a MAP alternative backhaul is not bound with a portal, or at the initialization of a temporary network deployment. Hence, activation of the alternative backhaul may be controlled by the central server for specific cases, e.g., when intermediate MAP nodes do not have a backhaul activation capability and an active portal is lost due to a hardware failure.

Figure 11:
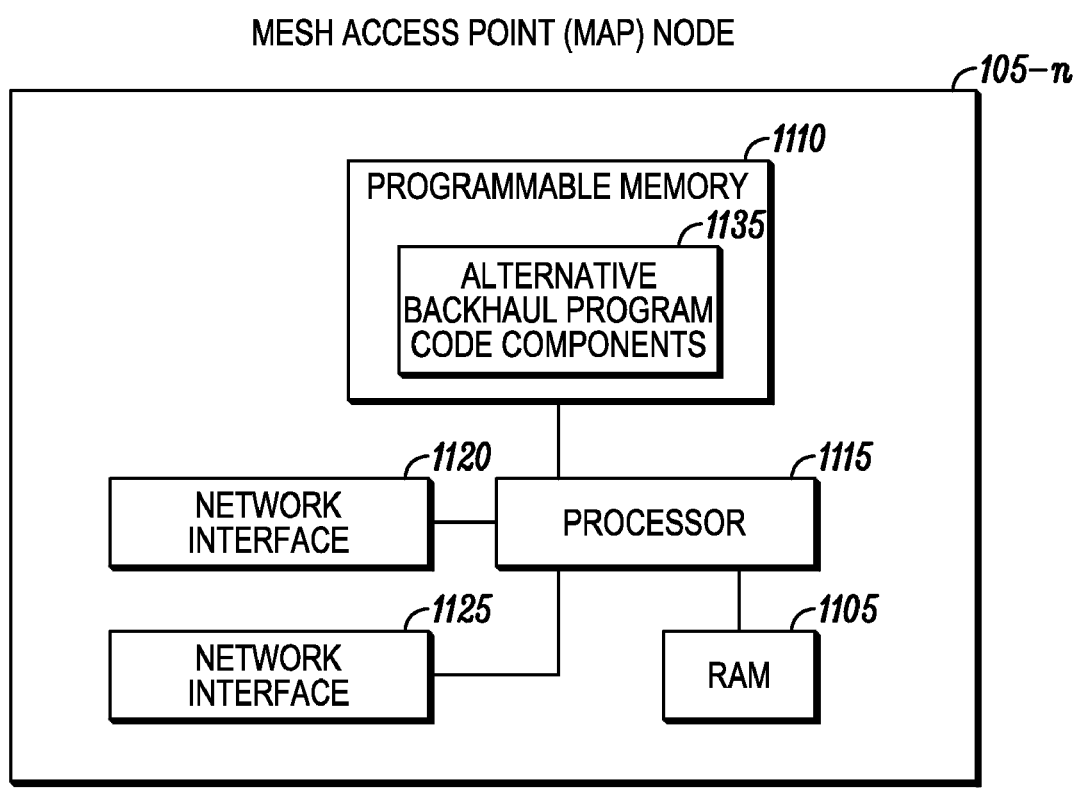
FIG. 11 is a block diagram illustrating system components of a MAP node, according to some embodiments of the present invention.

Referring to FIG. 11, a block diagram illustrates system components of the MAP node 105-n, according to some embodiments of the present invention. The MAP node 105-n comprises a random access memory (RAM) 1105 and a programmable memory 1110 that are coupled to a processor 1115. The processor 1115 also has ports for coupling to network interfaces 1120, 1125, which may comprise wired or wireless interfaces.

The network interfaces 1120, 1125 can be used to enable the MAP node 105-n to communicate with neighboring network nodes in the mesh network 100. For example, the network interface 1120 can be used to receive and send data packets from and to other MAP nodes 105-n, and the network interface 1125 can be used to receive and send data packets from and to STA nodes 110-n.

The programmable memory 1110 can store operating code (OC) for the processor 1115 and code for performing functions associated with a MAP node 105-n. For example, the programmable memory 1110 can comprise alternative backhaul computer readable program code components 1135 configured to cause execution of a method for providing an alternative backhaul portal in a mesh network as described herein.

Advantages of some embodiments of the present invention thus include enabling mesh network backhaul functions to obtain self-organizing and self-healing mesh capabilities. A mesh network can thus activate and deactivate one or more alternative backhaul portals as necessary based on network demand. That can provide more efficient network operations, improved network traffic load balancing, and improved overall network quality of service (QoS).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for providing an alternative backhaul portal in a mesh network, the method comprising:
   processing, by a first mesh access point, a registration of a mesh access point as an alternative backhaul portal between the mesh network and an external network, the first mesh access point functioning as a backhaul portal between the mesh network and the external network;
   determining that additional backhaul capacity is required in the mesh network; activating the mesh access point as an alternative backhaul portal in the mesh network in response to determining that additional backhaul capacity is required;
routing mesh network data through the alternative backhaul portal at the mesh access point;
determining that additional backhaul capacity is no longer required in the mesh network;
deactivating the mesh access point as an alternative backhaul portal in the mesh network in response to determining that additional backhaul capacity is no longer required;
wherein activating the mesh access point as an alternative backhaul portal in the mesh network comprises transmitting to the mesh access point a backhaul activation request message; and
wherein the backhaul activation request message comprises data selected from the following: a sender node type, an activation bit, activation time information, a current status, and traffic requirements.

2. The method of claim 1, wherein the method is performed at a central server in the mesh network.

3. The method of claim 1, wherein the method is performed at the first mesh access point.

4. The method of claim 1, wherein routing mesh network data through the alternative backhaul portal at the mesh access point is performed in response to load balancing requirements of the mesh network.

5. The method of claim 1, wherein processing a registration of the mesh access point as an alternative backhaul portal in the mesh network comprises processing an alternative backhaul status message received from the mesh access point.

6. The method of claim 1, wherein deactivating the mesh access point as an alternative backhaul portal in the mesh network comprises transmitting to the mesh access point a backhaul deactivation request message.

7. The method of claim 6, wherein the backhaul deactivation request message comprises data selected from the following: a sender node type, an activation bit, and deactivation time information.

8. The method of claim 1, wherein the additional backhaul capacity is required because of a loss of backhaul capacity at an existing backhaul portal.

9. The method of claim 1, wherein the alternative backhaul portal is established as a new backhaul interface at an existing backhaul portal.

10. A first mesh access point device comprising: computer readable program code components stored in a non-transitory computer readable storage medium executed by a processor for processing a registration of a mesh access point as an alternative backhaul portal between a mesh network and an external network, the first mesh access point functioning as a backhaul portal between the mesh network and the external network;
computer readable program code components stored in the non-transitory computer readable storage medium for determining that additional backhaul capacity is required in the mesh network;
computer readable program code components stored in the non-transitory computer readable storage medium for activating the mesh access point as an alternative backhaul portal in the mesh network in response to determining that additional backhaul capacity is required;
computer readable program code components stored in the non-transitory computer readable storage medium for routing mesh network data through the alternative backhaul portal at the mesh access point;
computer readable program code components stored in the non-transitory computer readable storage medium for determining that additional backhaul capacity is no longer required in the mesh network;
computer readable program code components stored in the non-transitory computer readable storage medium for deactivating the mesh access point as an alternative backhaul portal in the mesh network in response to determining that additional backhaul capacity is no longer required;
wherein activating the mesh access point as an alternative backhaul portal in the mesh network comprises transmitting to the mesh access point a backhaul activation request message; and
wherein the backhaul activation request message comprises data selected from the following: a sender node type, an activation bit, activation time information, a current status, and traffic requirements.

11. The device of claim 10, wherein the device functions as a central server in the mesh network.

12. The device of claim 10, wherein routing mesh network data through the alternative backhaul portal at the mesh access point is performed in response to load balancing requirements of the mesh network.

13. The device of claim 10, wherein processing a registration of the mesh access point as an alternative backhaul portal in the mesh network comprises processing an alternative backhaul status message received from the mesh access point.

14. The device of claim 10, wherein deactivating the mesh access point as an alternative backhaul portal in the mesh network comprises transmitting to the mesh access point a backhaul deactivation request message.

15. The device of claim 14, wherein the backhaul deactivation request message comprises data selected from the following: a sender node type, an activation bit, and deactivation time information.

16. A first mesh access point device comprising:
means for processing a registration of a mesh access point as an alternative backhaul portal between a mesh network and an external network, the first mesh access point functioning as a backhaul portal between the mesh network and the external network;
means for determining that additional backhaul capacity is required in the mesh network;
means for activating the mesh access point as an alternative backhaul portal in the mesh network in response to determining that additional backhaul capacity is required;
means for routing mesh network data through the alternative backhaul portal at the mesh access point;
means for determining that additional backhaul capacity is no longer required in the mesh network;
means for deactivating the mesh access point as an alternative backhaul portal in the mesh network in response to determining that additional backhaul capacity is no longer required;
wherein activating the mesh access point as an alternative backhaul portal in the mesh network comprises transmitting to the mesh access point a backhaul activation request message; and
wherein the backhaul activation request message comprises data selected from the following: a sender node type, an activation bit, activation time information, a current status, and traffic requirements.

* * * * *

UNITED STATES PATENT AND TRADEMARK OFFICE
CERTIFICATE OF CORRECTION

| | | |
|---|---|---|
| PATENT NO. | : 8,248,949 B2 | Page 1 of 1 |
| APPLICATION NO. | : 11/858507 | |
| DATED | : August 21, 2012 | |
| INVENTOR(S) | : Ozer et al. | |

It is certified that error appears in the above-identified patent and that said Letters Patent is hereby corrected as shown below:

In the Drawings:

In Fig. 1, Drawing Sheet 1 of 10, for Tag "115", in Line 2, delete "INFRASRUCTURE" and insert -- INFRASTRUCTURE --, therefor.

In Fig. 2, Drawing Sheet 2 of 10, for Tag "115", in Line 2, delete "INFRASRUCTURE" and insert -- INFRASTRUCTURE --, therefor.

In Fig. 2, Drawing Sheet 2 of 10, for Tag "210", in Line 2, delete "INFRASRUCTURE" and insert -- INFRASTRUCTURE --, therefor.

Signed and Sealed this
Sixteenth Day of April, 2013

Teresa Stanek Rea
*Acting Director of the United States Patent and Trademark Office*